INVENTOR
MATTHEW A. KRYGOWSKI

Martin G. Reiffin
ATTORNEY

April 8, 1969 M. A. KRYGOWSKI 3,437,938
CLOCK PULSE GENERATOR
Filed Dec. 17, 1965 Sheet 3 of 3

3,437,938
Patented Apr. 8, 1969

3,437,938

CLOCK PULSE GENERATOR

Matthew A. Krygowski, Wappingers Falls, N.Y., assignor to International Business Machines Corporation, Armonk, N.Y., a corporation of New York Filed Dec. 17, 1965, Ser. No. 514,501
Int. Cl. H03k *3/04, 3/64*
U.S. Cl. 328—62 20 Claims

ABSTRACT OF THE DISCLOSURE

A clock pulse generator for generating a sequence of electrical pulses comprising a plurality of latches, each associated with the generation of particular ones of the sequence of the electrical pulses. A single input pulse in conjunction with attendant logic circuitry and the plurality of latches generates the sequence of electrical pulses unless malfunctions exist so as to stop the clock pulse generator operation.

This invention relates to a clock pulse generator, usually referred to as a "clock," for generating timing signals utilized in controlling the sequence of operations in digital computers.

Generally the units of a computer system may be sampled periodically for proper operation either while operating normally or in a diagnostic mode. However, the pulse time divisions of the clock are too small to make dynamic tests possible for this unit. It is therefore a primary object of the present invention to obviate the problems arising from this testing incapacity by means of the novel features described below.

In order to properly control the sequence of operations of the computer system with which it is employed the disclosed embodiment of the invention is required to generate output pulses grouped into sequences each having three pulses. The latter correspond to three different clock phases to provide for sequential gating and sampling of control information and data within the system.

The first novel feature obviating the testing difficulty resides in the self-checking ability of the clock of the present invention. That is, the clock tests itself to determine if its own operation is functioning properly. If any clock pulse of the sequence does not occur, then the next succeeding clock pulse will not occur and the clock will stop and remain inoperative until a signal is transmitted to a reset line. Furthermore, if there is a malfunction in the clock so that one of the output lines remains active beyond the predetermined time period for its respective pulse, the clock will advance to the next successive pulse time and then stop.

The advantage of thus stopping the clock is that the state of the clock is frozen to permit diagnosis of the malfunction in either the clock or the computer system in which the clock is utilized. Furthermore, stopping the clock in the event that one of the pulses does not occur prevents the computer system from processing data out of proper sequence.

Another object of the present invention is to provide a clock which may be operated either in a free-running mode in response to a signal to one start input line, or may be operated in a single-cycle mode in response to a signal on another start input line. In the free-running mode the clock continuously generates a series of three-pulse sequences, whereas in the single-cycle mode the clock generates only a single sequence.

Still another novel feature of the present invention resides in its immunity to variations in time duration of the input signals. That is, in the free-running mode if the input line is deactivated intermediate a particular sequence of pulses the clock will nevertheless generate the remaining pulses of that sequence. If the input signal rises while the clock is still in sequence, the sequence is not aborted and the next sequence will start only upon completion of the previous sequence with no overlap. Similarly, in the single-cycle mode, the clock will generate only one complete sequence of three pulses irrespective of the time duration of the input signal.

A further object is to provide a clock pulse generator which may be stopped instanly upon command in response to a signal to an inhibit input line. When a malfunction occurs in the computer system it provides a signal to this inhibit input line of the clock to stop the latter instantly at the particular phase during which the malfunction occurs. This permits ready diagnosis of the nature of the malfunction. Should a clock output line be active at that time it will remain active.

Another important object of the present invention is to provide that the clock may be preset to stop at any one of the three pulse time periods. This permits diagnostic monitoring by feeding the computer system a series of test signals to cycle the system step by step through each of the sequence of operations. Alternatively, the system may be cycled dynamically with normal time intervals and then the system may be stopped to analyze it for timing problems. The preset stopping capability is further useful for the initial debugging of the system which may be sequenced through the successive operative steps by either manual pushbuttons or by a system program .

Still another novel feature resides in the nature of the single-cycle mode of operation. The latter occurs upon an input pulse on one of the start input lines. In response to the rise of the input pulse the clock generates the first two pulses of the sequence. The last pulse of the sequence is generated in response to the fall of the input pulse.

A more general object of the present invention is to provide a novel clock pulse generator which is reliable and efficient in operation, economical to manufacture, and readily maintained.

The foregoing and other objects, features and advantages of the invention are either inherent in the structure disclosed or will be apparent from the following more particular description of a preferred embodiment of the invention as illustrated in the accompanying drawings wherein:

FIGS. 1A and 1B together constitute a functional block circuit diagram showing a preferred embodiment of a clock pulse generator in accordance with the present invention;

Figures 1A, 2:
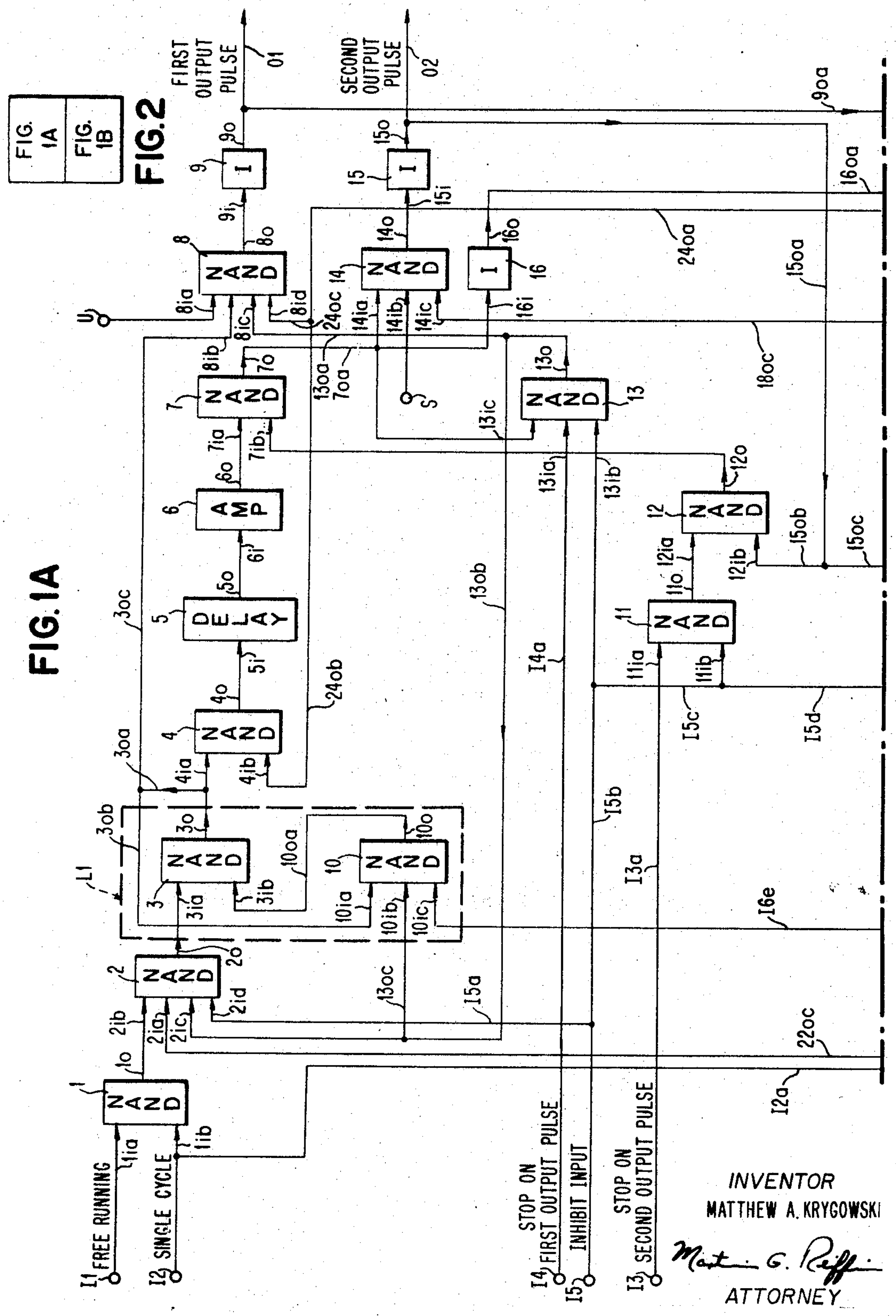
FIG. 2 is a composite diagram showing the relationship of FIGS. 1A and 1B.
Figure 1B:
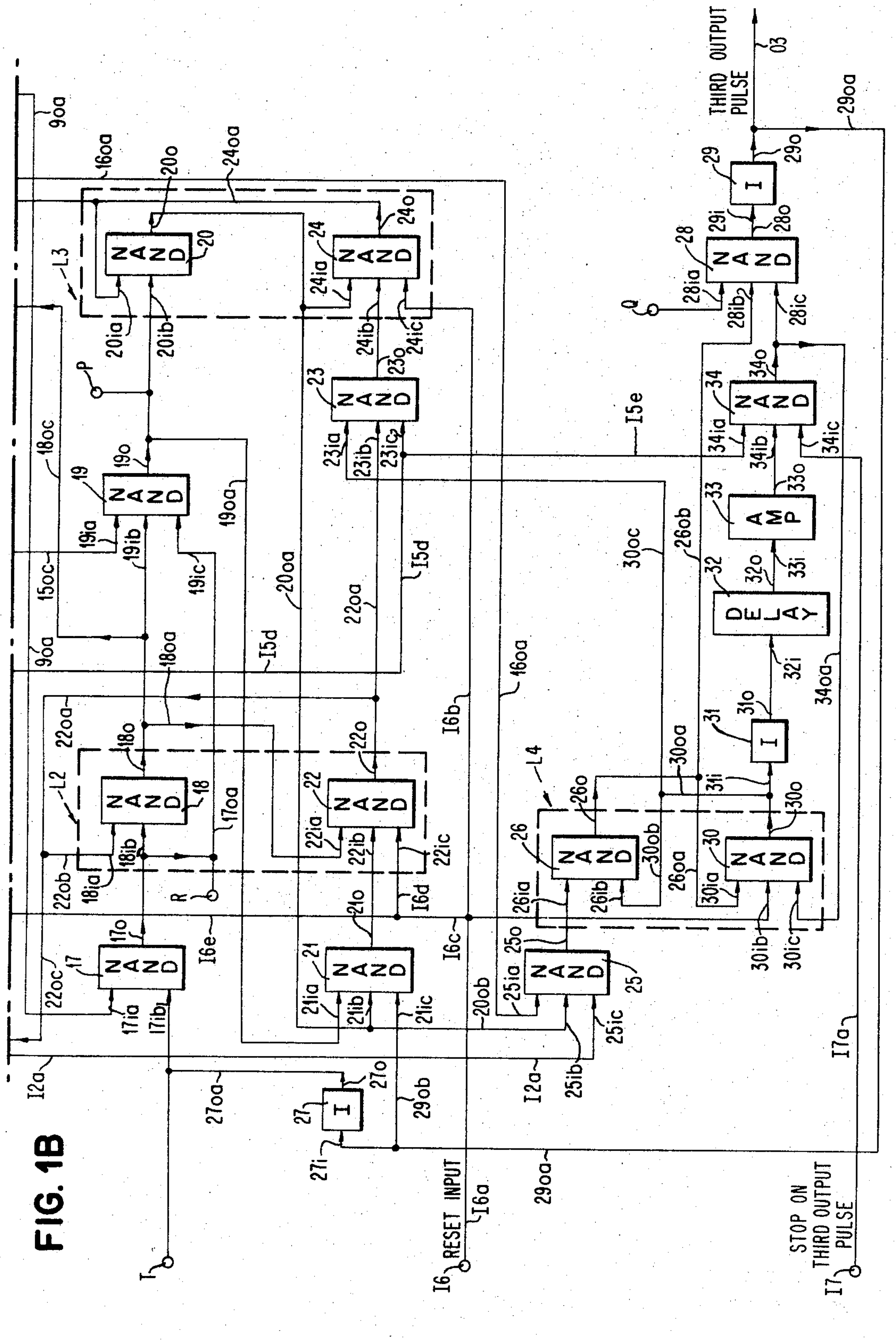

Referring now to the drawings in more detail, and first to FIGS. 1A and 1B, there are shown seven input lines designated respectively by the reference numerals I1 to I7 inclusive. Each of these input lines is at a positive potential level when inactive and at a negative level when activated. Describing first the single-cycle mode of operation of the clock, this mode is initiated by activating single-cycle start input line I2 connected to input 1*ib* of AND-INVERT logic circuit 1, otherwise known as a NAND gate. The latter, as well as all of the other NAND gates to be referred to hereinbelow, are of conventional well-known construction and operate in the following manner. If any input of the NAND gate is negative, its output will be positive. On the other hand, if all of the inputs to the NAND gate are positive, its output will be negative.

Since the other start input line I1 leading to the other input 1*ia* of NAND gate 1 is inactive and therefore at a positive level, the negative level at the input 1*ib* provided by the activation of start input I2 causes the output 1*o* of NAND gate 1 to be positive, which signal is transmitted to the input 2*ib* of NAND gate 2. Since the other inputs 2*ia*, 2*ic*, 2*id* of NAND gate 2 are also positive, its output 2*o* becomes negative thereby setting latch L1 comprising NAND gates 3 and 10. Output 3*o* of NAND gate 3 is connected through lead 3*ob* to input 10*ia* of NAND gate 10, and output 10*o* of NAND gate 10 is connected through lead 10*oa* to input 3*ib* of NAND gate 3. By the "set" condition of latch L1 as well as the other latches to be referred to hereinbelow, it is meant that the output line of the upper NAND gate of the latch is at a positive level whereas the output line of the lower NAND gate of the latch is at a negative level. Therefore when latch L1 is set its output 3*o* is at a positive level and its output 10*o* is at a negative level. In other words, when the latch is set it may be considered to be in a first state and a second state when it is not set.

The set condition of latch L1 thus transmits a positive signal through output 3*o* and leads 3*oa*, 3*oc* to input 8*ib* of NAND gate 8. The other inputs 8*ia*, 8*ic*, 8*id* of the latter are also at a positive level so as to provide a negative signal on output 8*o* of NAND gate 8. This signal is inverted by inverter 9 to impart a positive potential level to output line O1 thereby providing at the latter the first output pulse of the three-pulse sequence.

The positive signal at the output 9*o* of inverter 9 is also transmitted through lead 9*oa* to input 17*ia* of NAND gate 17 having its other input 17*ib* also at a positive level, thereby providing a negative level at its output line 17*o*. The latter is connected to input 18*ib* of NAND gate 18 constituting, together with NAND gate 22, a latch L2 which is interconnected and operates in the same manner described above with respect to latch L1. That is, output 18*o* is connected through lead 18*oa* to input 22*ia* and output 22*o* is connected through leads 22*oa*, 22*ob* to input 18*ia*. Latch L2 is thus set by the negative signal at its input 18*ib*.

The positive signal at output 3*o* of NAND gate 3 provided by the set condition of latch L1 is transmitted to input 4*ia* of NAND gate 4 having its other input 4*ib* also at a positive level so as to provide a negative signal at its output 4*o*. This negative signal is transmitted to input 5*i* of a delay device 5. The latter may be of any conventional type and functions to transmit a signal to its output line 5*o* at a predetermined time interval after the signal enters its input line 5*i*. Output 5*o* of delay 5 is connected to input 6*i* of an amplifier 6. The latter, as well as the other amplifier to be referred to hereinbelow, provides an amplified in-phase output without inversion.

The resulting negative signal at output 6*o* of amplifier 6 is fed to input 7*ia* of NAND gate 7 thereby causing output 7*o* of the latter to become positive. This positive signal is transmitted through lead 7*oa* to input 13*ic* of NAND gate 13 thereby causing its output 13*o* to become negative. The negative signal is transmitted to input 8*ic* of NAND gate 8 to cause its output 8*o* to become positive. This positive signal is fed to input 9*i* of inverter 9 causing its output 9*o* to become negative, thereby providing the fall or termination of the output pulse on output line O1.

The negative signal on output 13*o* of NAND gate 13 is transmitted through lead 13*ob* to input 2*ic* of NAND gate 2 thereby causing its output 2*o* to become positive so as to transmit a positive signal to input 3*ia* of NAND gate 3. The negative signal at output 13*o* of NAND gate 13 is also fed through leads 13*ob*, 13*oc* to input 10*ib* of NAND gate 10. As a result, latch L1 is reset.

The positive signal on output 7*o* of NAND gate 7 is fed to input 14*ia* of NAND gate 14. Since the other inputs 14*ib*, 14*ic* are positive, output 14*o* becomes negative. This negative signal is transmitted to input 15*i* of inverter 15 which provides at its output 15*o* the second positive output pulse to output line O2. This positive signal is transmitted through leads 15*oa*, 15*oc* to input 19*ia* of NAND gate 19 thereby causing its output 19*o* to become negative. Since latch L2 was previously set by the positive signal from output line O1 through lead 9*oa* into input 17*ia* of NAND 17, output 18*o* of NAND gate 18 is therefore at a positive level. Since output line O1 is now at a negative level, output 17*o* of NAND gate 17 is now at a positive level. This positive signal is transmitted through lead 17*oa* to input 19*ic* of NAND gate 19 thereby causing its output 19*o* to be at a negative level.

Output 19*o* is connected to input 20*ib* of NAND gate 20 which, together with NAND gate 24 constitutes a latch L3 which is interconnected and operates in the same manner as described above with respect to latch L1. That is, output 24*o* is connected to input 20*ia* and output 20*o* is connected to input 24*ia*. The negative signal at input 20*ib* of NAND gate 20 thus sets latch L3.

The previously described resetting of latch L1 provides a negative signal at output 3*o* of NAND gate 3 which is fed to input 4*ia* of NAND gate 4 so as to provide a positive signal at output 4*o* of the latter. This positive signal is transmitted through delay device 5 after a predetermined time period so as to provide a delayed positive signal at output 6*o* of amplifier 6. The signal is thereby transmitted to input 7*ia* of NAND gate 7 so that its output 7*o* becomes negative. This negative signal is transmitted to input 14*ia* of NAND gate 14 thereby causing its output 14*o* to become positive. This positive signal is inverted by inverter 15 so as to terminate the output pulse on output line O2.

The negative signal on output line 7*o* of NAND gate 7 is fed through lead 7*oa* to input 16*i* of inverter 16 which inverts the signal to provide at its output 16*o* a positive signal transmitted through lead 16*oa* to input 25*ia* of NAND gate 25. Since latch L3 was previously set, the leads 20*oa*, 20*ob* connected to input 25*ib* of NAND gate 25 are also at a positive level. The other input 25*ic* of NAND gate 25 is at a negative level for the duration of the active period of the start input I2.

It will thus be seen that when input I2 becomes inactive, that is, goes to a positive level, all inputs of NAND gate 25 will be at a positive level so as to provide a negative signal at output 25*o* of NAND gate 25 and input 26*ia* of NAND gate 26, thereby setting latch L4 comprising NAND gates 26 and 30. Output 26*o* of gate 26 is connected through lead 26*oa* to input 30*ia* of gate 30, and output 30*o* of the latter is connected through lead 30*ob* to input 26*ib* of gate 26. Setting of latch L4 provides a positive level on output 26*o* of NAND gate 26 which is transmitted through lead 26*ob* to input 28*ib* of NAND gate 28. The other inputs 28*ia*, 28*ic* of NAND gate 28 are also at a positive level so as to provide a negative level at its output 28*o*. This negative level is transmitted to input 29*i* of inverter 29 which provides the third positive output pulse at its output 29*o* to output line O3.

All three inputs 21*ia*, 21*ib*, 21*ic* of NAND gate 21 are now at a positive level for the following reasons. Since output line O3 is active, that is, at a positive level, this positive signal is transmitted through leads 29*oa*, 29*ob* to input 21*ic* of NAND gate 21. Since output line O2 is at a negative level, this negative signal is transmitted through leads 15*oa*, 15*oc* to input 19*ia* of NAND gate 19 causing its output 19*o* to be at a positive level. This positive signal is transmitted through lead 19*oa* to maintain input 21*ia* of NAND gate 21 at a positive level. Since latch L3 had previously been set during the period when output line O2 was active, output 20*o* of NAND gate 20 is at a positive level. This positive signal is transmitted through lead 20*oa* to input 21*ib* of NAND gate 21. Output 21*o* of NAND gate 21 is therefore at a negative level, this negative signal being transmitted to input **22*ib* of NAND gate 22** so as to reset latch L2.

The set input **18*ib* of latch L2 is maintained at an inactive positive level in the following manner. The positive level on output line O3 is transmitted through lead 29*oa* to inverter 27 to provide a negative signal at its output 27*o* and lead 27*oa* connected to input 17*ib* of NAND gate 17 thereby causing its output 17*o*** to be at a positive level to prevent latch L2 from being set.

After a predetermined time period corresponding to the time delay of a delay 32, latch L4 will be reset in the following manner. When latch L4 is first set, output **30*o* of NAND gate 30 and input 31*i* of inverter 31 go to a negative level. Output 31*o* of inverter 31 and input 32*i* of delay 32 thereby go to a positive level. This positive signal is transmitted to output 32*o* of delay 32 and input 33*i* of amplifier 33 after a predetermined delay period so as to provide a positive signal at output 33*o* of amplifier 33 and input 34*ib* of NAND gate 34. Since the other inputs 34*ia*, 34*ic* are positive, output 34*o* of NAND gate 34 drops to a negative level. This negative signal is transmitted through lead 34*oa* to input 30*ic* of NAND gate 30** so as to reset latch L4.

Now that latch L4 is reset, output **26*o* of NAND gate 26 is at a negative level. This negative signal is transmitted through lead 26*ob* to input 28*ib* of NAND gate 28 so as to cause its output 28*o* to be at a positive level. This positive signal is inverted by inverter 29** to treminate the third output pulse on output line O3.

Latch L3 is reset by the fall of the third output pulse in the following manner. All inputs **23*ia*, 23*ib*, 23*ic* of NAND gate 23 are at a positive level for the following reasons. The resetting of latch L2 causes output 22*o* of NAND gate 22 to be at a positive level. This positive signal is transmitted through lead 22*oa* to input 23*ib* of NAND gate 23. The resetting of latch L4 causes output 30*o* of NAND gate 30 to be at a positive level, which signal is transmitted through leads 30*oa*, 30*oc* to provide a positive level at input 23*ia* of NAND gate 23. Since inhibit input I5 is at a positive level, this signal is transmitted through leads I5*b*, I5*d* to provide a positive level at input 23*ic* of NAND gate 23. The positive levels at all of the inputs of the latter provide a negative level at its output 23*o* connected to input 24*ib* of gate 24** thereby resetting latch L3. Now all four of the latches have been reset and the circuit is in its initial state.

Figure 3:
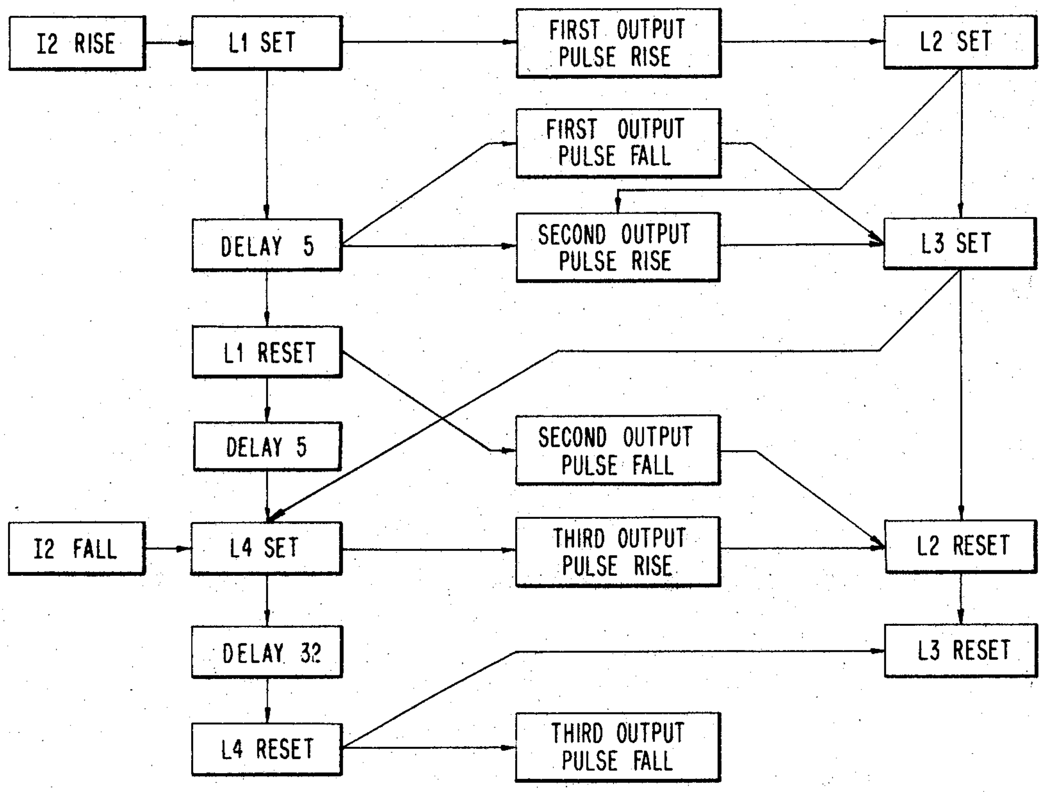
FIG. 3 is a logic flow diagram showing the interrelationship and sequence of operations of the principal components of the circuit shown in FIGS. 1A and 1B.

The above described sequence of operations is shown schematically in the logic flow diagram of FIG. 3. The rise of the input pulse at input I2, that is, the change of its potential level from the inactive positive level to the active negative level, causes latch L1 to set. This in turn initiates the rise of the first output pulse which in turn causes latch L2 to set. After the predetermined delay time of delay 5 the first output pulse falls and the second output pulse rises. These events, in conjunction with the setting of latch L2, causes the setting of latch L3. The signal transmitted through delay 5 also serves to reset latch L1.

The fall of the input pulse at input I2, that is, the return of the potential level of input I2 to the positive inactive level, together with the delayed reset condition of latch L1 and the set condition of latch L3 serves to set latch L4 which in turn initiates the rise of the third output pulse. Latch L2 is thereby reset. After the predetermined delay time provided by delay 32, latch L4 is reset so as to cause the third output pulse to fall and to cause latch L3 to be reset, thereby completing the cycle of operation and returning the circuit to its initial state.

Figure 4:
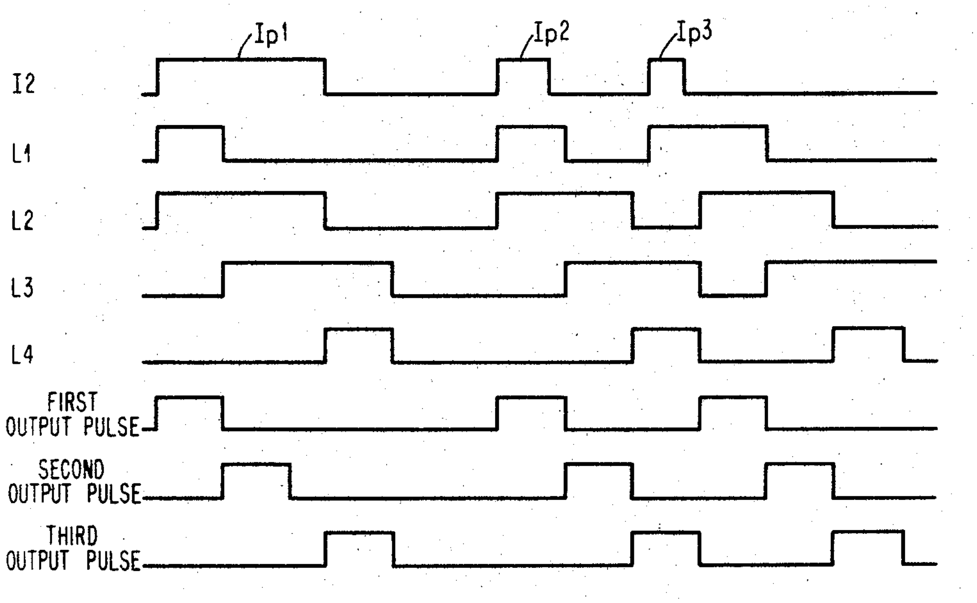
FIG. 4 is a time plot of the respective waveforms at various clock input, clock output and latch output lines of the circuit of FIGS. 1A and 1B.

The time sequence of the above described single-cycle mode of operation is shown in the time plot of FIG. 4 for three different start input pulse situations. The first situation is shown by the input pulse I*p*1 which falls after the fall of the second output pulse. The third output pulse does not rise until the input pulse I*p*1 falls. The second situation is that represented by the input pulse I*p*2 which falls before the fall of the second output pulse. In this event the third output pulse will rise at the fall of the second output pulse. The third situation is that represented by the input pulse I*p*3 which rises and falls during the third output pulse of the previous pulse sequence. In this situation the first pulse of the new sequence rises upon the fall of the third pulse of the previous sequence and the remaining two pulses of the new sequence proceed immediately thereafter.

The free-running mode of operation will now be described. This mode differs from the previously described single-cycle mode in that in the latter operation the third output pulse is not produced until the start input pulse on input I2 terminates. In the free-running mode of operation the termination of the input pulse is not a condition for production of the third output pulse.

It will be assumed that all of the input lines I1–I7 are initially at a positive inactive level. A negative signal on start input line I1 results in the production of the first and second output pulses on output lines O1 and O2 respectively in the same manner as described above with respect to the single-cycle operation. The initiation of the second output pulse causes latch L1 to be reset in the manner described above so as to provide a negative potential at output **7*o* after the time-delay period determined by delay 5**.

This provides a positive signal on output **16*o* of inverter 16 so that input 25*ia* of NAND gate 25 is at a positive level. Input 25*ic* of NAND gate 25 is also at a positive level since start input line I2 is inactive. Input 25*ib* of NAND gate 25 is also at a positive level because latch L3 was previously set at the initiation of the second output pulse. Since all inputs of NAND gate 25** are at a positive level, its output is at a negative level thereby setting latch L4 to provide the third output pulse on output line O3 in the same manner described above with respect to the single-cycle mode of operation.

The initiation of the third output pulse provides a positive signal through leads **29*oa*, 29*ob* to input 21*ic* of NAND gate 21. The other inputs to NAND gate 21 are also at a positive level, thereby providing a negative signal at its output 21*o*** so as to reset latch L2.

There are now two possibilities. The level of start input I1 may be either at a positive inactive level, or still at a negative active level. If at the positive level, no further output pulses will be generated because then all of the inputs of NAND gate 1 will be at a positive level to provide a negative level at its output **1*o* so that output 2*o* of NAND gate 2 will be at a positive level and latch L1 will not be set. (Latch L1 is set only when there is a negative level at output 2*o* thereof.) If start input I1 is at its negative active potential level, output 1*o* of NAND gate 1 and the inputs of NAND gate 2 will be at a positive level so that output 2*o* of gate 2** will be at a negative level, thereby setting latch L1 during the third output pulse.

The first output pulse of the next sequence will not be generated until the third output pulse of the present sequence is terminated, as shown by the following. Latch L3 was set at the rise of the second output pulse and remains in a set condition until the fall of the third output pulse. Therefore, during the third output pulse time the output **24*o* of NAND gate 24 is at a negative level. This negative signal is transmitted through leads 24*oa*, 24*ob*, 24*oc* to inputs 4*ib* and 8*id* of NAND gates 4 and 8 respectively. This inhibits both gates 4 and 8 so as to provide a positive level at their respective outputs 4*o* and 8*o*, thereby effectively blocking the signal transmitted by the setting of latch L1. Outputs 4*o* and 8*o*** will be able to attain a negative level only upon the termination of the third output pulse. Therefore the first output pulse of the next sequence will not commence during the interval of the third output pulse of the present sequence even though latch L1 may be set by a signal to either start input I1 or start input I2.

The self-checking mode of operation of the clock in accordance with the present invention will now be described. A positive level at output line O1 is a necessary condition for setting latch L2. The setting of latch L2 is a necessary condition for the generation of the second output pulse. Therefore, if the first output pulse does not occur, then the second output pulse will not occur. Similarly, a positive level at output line O2 is a necessary condition for the setting of latch L3. The setting of latch L3 is in turn a necessary condition for the generation of the third output pulse. Hence if the second output pulse does not occur, then the third output pulse will not be generated. The third output pulse is a necessary condition for the resetting of latch L2 which is a necessary condition for the subsequent setting of latch L1. The set state of latch L1 is in turn a necessary condition for the generation of the first output pulse of the next succeeding sequence which therefore will not be generated unless the previous sequence has been generated.

If one of the outputs O1, O2, O3 remains logically active, that is, at a positive potential, the clock will advance to the next output pulse time and then stop. This is achieved in the following manner.

If output O1 is at a positive level during the second output pulse time, then input **17*ia* of NAND gate 17 is at a positive level. The other input 17*ib* of NAND gate 17 is also at a positive level because lead 29*oa* to input 27*i* of inverter 27 is at a negative level due to the fact that there is no third output pulse and output O3 is inactive at that time. Since both inputs 17*ia*, 17*ib* of NAND gate 17 are positive, its output 17*o* will be at a negative level. This negative signal is transmitted through lead 17*oa* to input 19*ic* of NAND gate 19 so that its output 19*o* is at a positive level thereby preventing the setting of latch L3 which normally would occur at the rise of the second output pulse. The setting of latch L3 is a condition for the setting of latch L4 because when latch L3 is set output 20*o* is positive to provide a positive level at input 25*ib* of NAND gate 25** which is a necessary condition for the setting of latch L4. Since the latter is a necessary condition for the occurrence of the third output pulse, this third output pulse will not occur if the first output pulse remains up or active throughout the second output pulse time.

If output O2 remains active (positive) during the third output pulse time, input **19*ia* of NAND gate 19 is positive. Input 19*ib* of NAND gate 19 is positive because latch L2 had previously been set during the first output pulse time. Input 19*ic* of NAND gate 19 is also positive because output 17*o* of NAND gate 17 is positive since its input 17*ia* is negative due to the inactive state of output O1. Therefore output 19*o* of NAND gate 19 is negative so that the output 21*o* of NAND gate 21 is positive, thereby preventing the resetting of latch L2 which would normally occur at the rise of the third output pulse. The resetting of latch L2 is a necessary condition for the setting of latch L1 because resetting of latch L2 makes output 22*o* positive thereby making input 2*ia* of NAND gate 2** positive which is a necessary condition for the setting of latch L1. Since the setting of latch L1 is a necessary condition for the generation of the first output pulse of the next sequence, the latter will not occur if output O2 is active throughout the third output pulse time.

If output O3 remains active during the first output pulse time of the next clock sequence, input **17*ib* of NAND gate 17 is at a negative level so that its output 17*o* will be positive thereby preventing the setting of latch L2. The setting of latch L2 is a necessary condition for the occurrence of the second output pulse because when latch L2 is set output 18*o* is positive thereby satisfying NAND gate 14 to provide a negative level at its output 14*o* and this negative signal is inverted by inverter 15** to provide the second output pulse. Therefore if output O3 remains active during the first output pulse time of the next sequence, the second output pulse of the next sequence will not occur.

The immunity of the clock operation to varying length inputs to start input I1 will now be described. That is, at the trailing edge of the input pulse to start input I1 the clock will finish its sequence and then remain inactive regardless of where in the sequence the input pulse dropped. This is achieved in the following manner.

After latch L1 has been set by the initiation of the input signal at input I1 the latter does not affect the clock operation until the third output pulse time occurs. If at that time input I1 is at a positive or inactive level, latch L1, which was previously reset, will not be set again. The free-running series of pulse sequences is thus terminated. However, if input I1 is at a negative or active level during the third output pulse time then latch L1 will be set in the manner described above and the free-running mode of operation will continue. In either event there will be provided a full sequence of three output pulses at the termination of the free-running mode.

The clock operation is also immune to varying length inputs to input line I2, as shown by the following. The fall of the second output pulse may occur either before or after the termination of the input pulse to input I2. If before, the third output pulse will not be generated until input I2 attains its inactive positive level to provide positive levels at all inputs of NAND gate 25. The fact that input I2 is at an inactive positive level prevents the setting of latch L1 during the third output pulse time. Thus a single negative pulse to input I2 will cause a single sequence of three output pulses. If the fall of the second output pulse occurs after the termination of the input signal to input I2, the last input of NAND gate 25 to go positive will be **25*ia*** which occurs at the fall of the third output pulse. During the third output pulse time input I2 is at a positive level so as not to set latch L1. Therefore in this case there will also be generated only a single sequence of three output pulses.

The inhibit input I5 is normally at a positive or inactive level. A negative input signal to input I5 is transmitted through lead **I5*a* to input 2*id* of NAND gate 2** thereby preventing the subsequent setting of latch L1 should an input signal be applied to either start input I1 or start input I2. Hence the sequence of three clock output pulses will not commence as long as the negative signal is applied to inhibit input I5.

In order for the first output pulse to be initiated, output **13*o* of NAND gate 13 must be at a positive level and latch L1 must have been set. The negative signal to inhibit input I5 is transmitted through lead I5*b* to input 13*ib* of NAND gate 13 thereby maintaining output 13*o* at a positive level. This positive signal is transmitted through leads 13*ob*, 13*oc* to input 10*ib* of NAND gate 10 thereby preventing the resetting of latch L1. This positive level at leads 13*ob*, 13*oc* is maintained by the negative input signal to inhibit input I5 notwithstanding a change in level of output 7*o* which would normally occur after the time delay period determined by delay 5. Hence the signal generated by the previous setting of latch L1 and delayed when passing through delay 5, would normally cause the first output pulse to terminate by transmitting a positive signal to input 13*ic* of NAND gate 13 so as to cause the output 13*o*** thereof to become negative. Therefore, an inhibit input signal to input I5 during the first output pulse time will cause the clock to be frozen in the condition whereby the first output pulse is maintained. That is, output O1 is held at an active positive level.

If a negative signal is applied to inhibit input I5 during the second output pulse time, this negative signal transmitted through leads **I5*b*, I5*c* to input 11*ib* of NAND gate 11 will cause output 11*o* of the latter to be at a positive level. This positive signal is transmitted to input 12*ia* of NAND gate 12. The other input 12*ib* of NAND gate 12 is also at a positive level because the positive level of output O2 is transmitted through leads 15***oa*, 15*ob* to said input 12*ib*. Output 12*o* of NAND gate 12 is thereby at a negative level to maintain output 7*o* of NAND gate 7 at a positive level. This positive level of output 7*o* is maintained irrespective of the change of signal level on output 6*o* of amplifier 6. Hence input 14*ia* of NAND gate 14 is at a positive level. Input 14*ic* of NAND gate 14 connected through lead 18*oc* to output 18*o* of latch L2 is also at a positive level since latch L2 was previously set at the start of the first output pulse time and is not reset until the start of the third output pulse time. Input 14*ib* of NAND gate 14 is also at a positive level since node S in inactive. Hence NAND gate 14 is satisfied so that its output 14*o* is at a negative level. This negative signal is inverted by inverter 15 to maintain a positive level at output O2. The second output pulse is thus maintained as long as inhibit input I5 is at a negative level.

If a negative signal is applied to inhibit input I5 during the third output pulse time this negative signal is transmitted through leads I5*b*, I5*d*, I5*e* to input 34*ia* of NAND gate 34 to maintain a positive level at its output 34*o*, thereby maintaining a negative level at output 28*o* of NAND gate 28, which negative level is inverted by inverter 29 to maintain a positive level at output O3 for as long as the inhibit I5 is activated and irrespective of changes in signal level transmitted through NAND gates 30, 34, and inverter 31.

The circuitry by which the clock may be preset to stop in any one of the three pulse time periods will now be described. For this purpose there are provided three stop inputs I3, I4, I7. A negative input signal to stop input I4 is transmitted by lead I4*a* to input 13*ia* of NAND gate 13 to cause its output 13*o* to be at a positive level. This positive signal is transmitted through lead 13*oa* to input 8*ic* of NAND gate 8. When latch L1 is subsequently set to provide a positive level at lead 3*oc*, all of the inputs of NAND gate 8 are at a positive level to initiate the rise of the first output pulse at output O1. The negative signal to stop input I4 transmitted to input 13*ia* of NAND gate 13 has the same effect as the negative signal to clock inhibit input I5 transmitted to input 13*ib* of NAND gate 13, as described above, so as to maintain the first output pulse at its active positive level. The clock is thereby stopped at the first output pulse time.

The clock sequence is resumed in the following manner when stop input I4 is deactivated. During the first output pulse time, output 7*o* of NAND gate 7 is at a negative level. When the signal corresponding to the set state of latch L1 is transmitted through delay 5, output 7*o* of NAND gate 7 becomes positive. This positive signal is transmitted through lead 7*oa* to input 13*ic* of NAND gate 13. If the stop input I4 is deactivated to its inactive positive level, then all of the inputs 13*ia*, 13*ib*, 13*ic* of NAND gate 13 are positive to provide a negative level at its output 13*o*. This negative signal is transmitted through lead 13*oa* to input 8*ic* of NAND gate 8 thereby providing a positive level at its output 8*o*. This terminates the first output pulse. Simultaneously, the negative signal on lead 13*oa* is transmitted through leads 13*ob*, 13*oc* to reset latch L1. The circuit conditions are thereby established for the generation of the second output pulse.

In order to stop the clock at the second output pulse time, a negative signal is applied to stop input I3 and will be transmitted by lead I3*a* to input 11*ia* of NAND gate 11 so that output 11*o* of the latter will be at a positive level. When a positive signal on lead 15*ob* to input 12*ib* subsequently arrives at the rise of the second output pulse, NAND gate 12 will then be satisfied to provide a negative signal on its output 12*o* thereby causing the output 7*o* of NAND gate 7 to be positive irrespective of changes of potential level of input 7*ia*. Therefore, all inputs 14*ia*, 14*ib*, 14*ic* of NAND gate 14 will be maintained at a positive level to maintain the positive level on output O2. The clock is thereby stopped at the second output pulse time.

When stop input I3 is deactivated to a positive potential level, output 11*o* of NAND gate 11 is then negative to provide a positive level at output 12*o* of NAND gate 12. Output 7*o* of NAND gate 7 will then switch levels depending upon the level of its input 6*ia*. If the latter is positive due to the resetting of latch L1, then both inputs 7*ia*, 7*ib* of NAND gate 7 will be positive to provide a negative level at its output 7*o* and thereby provide a positive level at output 14*o* of NAND gate 14 so as to terminate the second output pulse. The negative signal at output 7*o* is transmitted through lead 7*oa* and inverted by inverter 16. The resulting positive signal is transmitted through lead 16*oa* to input 25*ia* of NAND gate 25 satisfying the latter to provide a negative signal at its output 25*o* to set latch L4 and to initiate the third output pulse in the manner described above.

In order to stop the clock at the third output pulse time, a negative signal applied to stop input I7 provides a positive level at output 34*o* of NAND gate 34. When latch L4 is subsequently set, a positive level is thereby provided at input 28*ic* of NAND gate 28 causing the third output pulse to occur. When the signal corresponding to the set state of latch L4 is transmitted through delay 32 and amplifier 33 to provide a positive level at output 33*o* of the latter, output 34*o* of NAND gate 34 will be maintained at its positive level and will not change state because of the negative signal applied by stop input I7 through lead I7*a* to input 34*ic* of NAND gate 34. Therefore, latch L4 will not be reset and output O3 will be maintained at an active level.

When stop input 17 is deactivated to a positive level the output 34*o* of NAND gate 34 will become negative since all of its inputs will then be at a positive level, thereby resetting latch L4 and terminating the third output pulse. It is therefore possible to stop at any output pulse time and to advance to and stop within any other clock output pulse time by activating inputs I3, I4, I7 in the desired sequence.

In some computer systems it may be desirable to guarantee nonoverlapping of the clock output pulses. This is achieved by connecting node P to node Q, node R to node S, and node T to node U. If output O1 is active, input 18*ib* of NAND gate 18 is at a negative level, as explained above. Hence, the potential at node R is negative. Therefore node S is at a negative potential and output 14*o* of NAND gate 14 is positive, and output O2 is negative or inactive so that the second output pulse does not occur. When output O1 becomes inactive, output 17*o* becomes positive thereby permitting the occurrence of the second output pulse. As a result, overlapping operation of the first and second output pulses is prevented.

If output O2 is active, node P will be at a negative level as explained above. Therefore node Q connected to node P will also be at a negative level causing output 28*o* of NAND gate 28 to be positive thereby providing an inactive level at output O3 so as to prevent the occurrence of the third output pulse. When output O2 becomes inactive node P is positive and node Q is also positive, thereby permitting the third output pulse to occur. Overlapping relation between the second and third output pulses is thus obviated.

If output O3 is at an active level, node T is negative so that node U connected thereto is also negative, thereby providing a positive level at output 8*o* of NAND gate 8 so that output O1 is at a negative level and thereby preventing the occurrence of the first output pulse of the next sequence. When output O3 becomes inactive, node T is positive. Therefore node U is positive thereby permitting the first output pulse to occur. A nonoverlapping relation between the third output pulse and the first output pulse of the next sequence is thereby provided. It can be readily seen that with this type of connection if one of the outputs remains logically active ("up" level) the clock will not generate further clock pulses.

If the initiating signal pulse to start input I1 or I2 rises again during the third output pulse time and also falls again during this same third output pulse time, the condition is remembered so as to cause the three-pulse sequence to occur again after the fall of the third output pulse. This feature is useful because if the central processing unit or other system unit which generates the initiating signal is faster than the clock, the initiating signal is not lost but instead serves to generate the next successive sequence of clock output pulses. This is achieved in the following manner.

During the third output pulse time latch L2 is reset so that its output 22o and lead 22oc are at a positive level. Lead 13ob will also be at a positive level during the third output pulse time because latch L1 was previously reset during the second output pulse time. Therefore all inputs of NAND gate 2 input 2ib are positive. Input 2ib becomes positive whenever there is an initiating signal on either start input I1 or start input I2. In this event output 2o of NAND gate 2 becomes negative thereby setting latch L1. Should the start input I1 or I2 become inactive its previous active state is now remembered by the set condition of latch L1. Therefore, when latch L3 is reset at the fall of the third output pulse, output 24o of NAND gate 24 of latch L3 is positive causing the first output pulse of the next sequence to rise at that time. The normal sequence of three output pulses is thereby generated. If signal pulses on inputs I1 or I2 arrive during the third output pulse time, the time duration of the third output pulse is not affected and there is no overlap between the third output pulse of one sequence and the first output pulse of the next sequence.

The reset input line I6 is used to guarantee the initial state of the clock. It is activated for example when power is first applied to the machine. A negative or down level signal applied to input I6 is transmitted through leads I6*a* to I6*e* inclusive to reset latches L1, L2, L3 and L4. During this resetting operation the two clock start inputs I1 and I2 should be at the positive or inactive level.

While the invention has been particularly shown and described with reference to a preferred embodiment thereof, it will be understood by those skilled in the art that the foregoing and other changes in form and details may be made therein without departing from the spirit and scope of the invention.

I claim:

1. A clock pulse generator comprising:
a plurality of output lines,
means for generating a sequence of electrical pulses each on a respective one of said output lines to change the potential of the latter to an active level for the duration of the respective pulse,
a plurality of stop lines each associated with a respective one of said pulses and adapted to be activated, and
means responsive to the activation of any of said stop lines and the occurrence of its respective pulse to maintain the respective output line potential at its active level and to stop the generator for so long as said stop line remains activated.

2. A clock pulse generator as recited in claim 1 and comprising:
means responsive to the deactivation of said activated stop line to continue the operation of the generator and the remaining successive pulses of the sequence.

3. A clock pulse generator as recited in claim 2 and comprising:
a plurality of circuit means each actuated in response to the generation of a respective one of said pulses, and
inhibiting means for preventing the generation of a pulse in response to the nonactuation of the circuit means corresponding to the preceding pulse of the sequence.

4. A clock pulse generator comprising:
means for generating a sequence of electrical pulses, a plurality of stop lines each associated with a respective one of said pulses and adapted to be activated,
means responsive to the activation of any of said stop lines and the occurrence of its respective pulse to maintain the duration of the latter and to stop the generator for so long as said stop line remains activated, and
means responsive to the deactivation of said activated stop line to continue the operation of the generator and the remaining successive pulses of the sequence.

5. A clock pulse generator comprising:
a start input adapted to be activated,
means for initiating the generation of at least one sequence of pulses in response to activation of the start input, and
circuit means responsive to the deactivation of said start input intermediate a sequence of pulses for thereafter generating the remaining pulses of said last-recited sequence,
whereby the operation of the clock is unaffected by the duration of activation of the start input.

6. A clock pulse generator as recited in claim 5 wherein:
said initiating means is responsive to activation of said start input to initiate the generation of a continuous series of repeated pulse sequences so that the generator operates in a free-running mode,
said circuit means being responsive to the deactivation of said start input intermediate a sequence of pulses for thereafter generating the remaining pulses of only said last-recited sequence.

7. A clock pulse generator as recited in claim 5 and comprising:
a second start input,
said initiating means being responsive to activation of said first-recited start input to initiate the generation of a continuous series of repeated pulse sequences so that the generator operates in a free-running mode,
said initiating means being responsive to activation of said second start input to initiate the generation of a single sequence of pulses,
said circuit means being responsive to the deactivation of either of said start inputs intermediate a sequence of pulses for thereafter generating the remaining pulses of only said last-recited sequence.

8. A clock pulse generator as recited in claim 5 and comprising:
a plurality of circuit means each actuated in response to the generation of a respective one of the pulses of the sequence,
inhibiting means for preventing the generation of a pulse in response to the nonactuation of the circuit means corresponding to the preceding pulse,
a plurality of stop inputs each associated with a respective pulse of the sequence and adapted to be activated, and
means responsive to the activation of any stop input for extending the time duration of the respective pulse associated therewith for the time period during which said stop input remains activated.

9. A clock pulse generator comprising:
a first start input adapted to be activated,
a second start input adapted to be activated,
means for generating a continuous series of repeated sequences of pulses in response to the activation of said first start input, and
means for generating a single sequence of pulses in response to the activation of said second start input.

10. A clock pulse generator comprising:
a plurality of output lines,
means for generating a sequence of electrical pulses each on a respective one of said output lines to change the potential of the latter to an active level for the duration of the respective pulse,
an inhibit line adapted to be activated, and means responsive to the activation of said inhibit line to instantaneously stop said generating means and to maintain said output lines at the respective potential levels existing at the instant of activation of said inhibit line.

11. A clock pulse generator comprising:
a plurality of output lines,
means for generating a sequence of electrical pulses each on a respective one of said output lines to change the potential of the latter to an active level for a predetermined time duration, and
means responsive to the extension of said active level beyond said predetermined time duration for stopping said generating means.

12. A clock pulse generator comprising:
a plurality of output lines,
means for generating a sequence of electrical pulses each on a respective one of said output lines to change the potential of the latter to an active level for a predetermined time duration,
an inhibit line adapted to be activated,
means responsive to the activation of said inhibit line to instantaneously stop said generating means and to maintain said output lines at the respective potential levels existing at the instant of activation of said inhibit line,
a first start input adapted to be activated,
a second start input adapted to be activated,
means responsive to activation of said first start input to actuate said generating means to generate a continuous series of repeated pulse sequences so that the generator operates in a free-running mode,
means responsive to activation of said second start input to actuate said generating means to generate a single sequence of pulses,
circuit means responsive to the deactivation of either of said start inputs intermediate a sequence of pulses for thereafter generating the remaining pulses of only said last-recited sequence,
a plurality of latch means each actuated in response to the generation of a respective one of the pulses of a sequence,
means for preventing the generation of a pulse in response to the nonactuation of the latch means corresponding to the preceding pulse,
a plurality of stop inputs each associated with a respective pulse of a sequence,
means for activating any one or more of said stop inputs,
means responsive to the activation of any stop input for extending the time duration of the respective pulse associated therewith for the time period during which said stop input remains activated,
said generating means including means responsive to the initiation of an input pulse to said second start input for generating a first set of pulses of said single sequence and means responsive to the termination of said input pulse for generating at least one additional pulse of said single sequence, and
means responsive to the extension of said active level of any of said output lines beyond said predetermined time duration for stopping said generating means.

13. A clock pulse generator comprising:
(a) an input start line means for initiating the generation of a sequence of electrical pulses in response to a single input pulse being applied thereto,
(b) a plurality of interconnected circuit means connected to said input start line means and responsive to said single input pulse for generating said sequence of electrical pulses when switched to a first state, respective ones of said plurality of interconnected circuit means associated with the generation of particular ones of said sequence of electrical pulses,
(c) logic circuitry connected to said plurality of interconnected circuit means for preventing the generation of a pulse in said sequence of electrical pulses in response to one of said plurality of interconnected circuit means associated with the preceding pulse of said sequence of electrical pulses being maintained in a second state, and
(d) the clock pulse generator stopping itself in the event that any pulse of said sequence of electrical pulses fails to occur.

14. A clock pulse generator as in claim 13 wherein:
(a) said plurality of interconnected circuit means comprise a plurality of latches.

15. A clock pulse generator as in claim 13 wherein:
(a) said logic circuitry is operative to prevent the generation of all subsequent pulses in said sequence of electrical pulses in response to one of said plurality of interconnected circuit means corresponding to any preceding pulse in said sequence of electrical pulses being maintained in a second state, and
(b) reset means responsive to a reset signal to restore the generator to its initial condition before the generation of a first pulse in said sequence of electrical pulses.

16. A clock pulse generator as in claim 13 wherein:
(a) the interconnected circuit means of said plurality of interconnected circuit means associated with the generation of the last pulse of said sequence of electrical pulses is switched to a first state in response to the generation of the penultimate pulse in said sequence of electrical pulses,
(b) means for deactuating said plurality of interconnected circuit means in response to the generation of all of said pulses in said sequence of electrical pulses,
(c) said logic circuitry preventing the generation of the first pulse of said sequence of electrical pulses in response to any of said plurality of interconnected circuit means being maintaained in a first state by a pulse in a previous sequence of electrical pulses, and
(d) whereby the first pulse of one sequence of electrical pulses will not be generated unless the entire previous sequence of electrical pulses has been generated.

17. A clock pulse generator as in claim 13 further comprising:
(a) a plurality of outputs each associated with a respective pulse of said sequence of electrical pulses, and
(b) each of said electrical pulses appearing at its respective output.

18. A clock pulse generator as in claim 13 further comprising:
(a) a plurality of stop inputs each associated with a respective pulse of said sequence of electrical pulses,
(b) means for activating any one or more of said stop inputs, and
(c) means responsive to the activation of any stop input for extending the time duration of the respective pulse associated therewith for the time period during which said stop input remains activated, whereby the clock pulse generator may be preset to stop at any pulse of the sequence.

19. A clock pulse generator as in claim 13 further including:
(a) a plurality of output lines each associated with a respective pulse of said sequence,
(b) each of said pulses appearing at its respective output line whereby the potential of each output line is at an active level for the duration of its respective pulse,
(c) a plurality of stop input lines each associated with a respective pulse of said sequence and adapted to be activated, and
(d) means responsive to the activation of any stop input line and the occurrence of its associated pulse to maintain the potential of the respective output line at its active level for the time period of activation of the stop input line and thereby stop the clock pulse generator at any pulse of the sequence.

20. A clock pulse generator comprising:

(a) an input start line means being connected to receive a single input pulse, (b) a plurality of interconnected circuit means, (c) logic circuitry means interconnecting said plurality of interconnected circuit means, (d) said plurality of interconnected circuit means and said logic circuitry means being solely responsive to said single input pulse for generating a sequence of electrical pulses, and (e) one of said interconnected circuit means of said plurality of interconnected circuit means being responsive solely to the termination of said single input pulse for generating the final pulse of said sequence of electrical pulses.

References Cited

UNITED STATES PATENTS 3,320,539 5/1967 Rodner ---------------- 328—62

ARTHUR GAUSS, *Primary Examiner.*

JOHN ZAZWORSKY, *Assistant Examiner.*

U.S. Cl. X.R.

328—75; 307—215, 269